(12) United States Patent
Baszczok et al.

(10) Patent No.: US 8,821,949 B2
(45) Date of Patent: *Sep. 2, 2014

(54) MICROBIOLOGICAL REPROCESSING OF BY-PRODUCTS OF BIODIESEL PRODUCTION

(75) Inventors: Franciszek Baszczok, Katowice (PL); Waldemar Rymowicz, Wroclaw (PL)

(73) Assignee: Skotan Spolka Akcyjna, Katowice (PL)

(*) Notice: Subject to any disclaimer, the term of this patent is extended or adjusted under 35 U.S.C. 154(b) by 251 days.

This patent is subject to a terminal disclaimer.

(21) Appl. No.: 12/989,105

(22) PCT Filed: Apr. 22, 2009

(86) PCT No.: PCT/PL2009/050006
§ 371 (c)(1),
(2), (4) Date: Dec. 21, 2010

(87) PCT Pub. No.: WO2009/131476
PCT Pub. Date: Oct. 29, 2009

(65) Prior Publication Data
US 2011/0111090 A1    May 12, 2011

(30) Foreign Application Priority Data

Apr. 23, 2008    (PL) .......................... 385009

(51) Int. Cl.
*C12N 1/16* (2006.01)
*A01N 63/00* (2006.01)
(52) U.S. Cl.
USPC ....... 426/60; 435/71.2; 435/255.1; 424/93.51
(58) Field of Classification Search
CPC .................................. A01N 63/00; C12N 1/16
USPC ............... 426/60; 435/255.1, 71.2; 424/93.51
See application file for complete search history.

(56) References Cited

U.S. PATENT DOCUMENTS

| 3,713,976 A | 1/1973 | Bunting et al. |
| 3,843,800 A | 10/1974 | Langejan |
| 2007/0209599 A1 | 9/2007 | Block et al. |

FOREIGN PATENT DOCUMENTS

| WO | WO 2007/017356 | 2/2007 |
| WO | WO 2009/131475 | 10/2009 |

OTHER PUBLICATIONS

Papanikolaou et al., Lipid production by *Yarrowia lipolytica* growing on industrial glycerol in a single-stage continuous culture. Bioresource Technology 82 (2002) pp. 43-49.*
Juszczyk et al., Dobór szczepów dożdży do produckji biomasy z glicerolu opadowego. Acta Scientarium Polonorum, Biotechnologia, vol. 4 No. 1-2 (2005) pp. 65-76.*
Kim et al., High cell density culture of *Yarrowia lipolytica* using a one-step feeding process. Biotechology Progress, vol. 16 (2000) pp. 657-660.*
Freshney, Culture of Animal Cells: A Manual of Basic Technique and Specialized Applications. Wiley-Blackwell, Sixth Edition, Chp 8.*
International Search Report issued by the International Searching Authority (ISA/O.E.P.M.) on May 11, 2009 in connection with International Application No. PCT/PL2009/050005.
Papanikolaou Seraphim et al., "Lipid production by *Yarrowia lipolytica* growing on industrial glycerol in a single-stage continuous culture", Bioresource Technology, Elsevier Bv, GB, vol. 82, No. 1, Mar. 1, 2002, pp. 43-49.
International Search Report issued by the International Searching Authority (ISE/EP) on Mar. 30, 2009 in connection with international application No. PCT/PL2008/000077.
Written Opinion of the International Search Authority issued May 5, 2010 in connection with PCT International Application No. PCT/PL2008/000077.
International Preliminary Report on Patentability issued May 11, 2010 in connection with PCT International Application No. PCT/PL2008/000077.
Written Opinion of the International Search Authority issued Oct. 23, 2010 in connection with PCT International Application No. PCT/PL2009/050005.
International Preliminary Report on Patentability issued Oct. 26, 2010 in connection with PCT International Application No. PCT/PL2009/050005.
International Search Report issued by the International Search Authority on Nov. 12, 2009 in connection with PCT International Application No. PCT/PL2009/050006.
Written Opinion of the International Search Authority issued Oct. 23, 2010 in connection with PCT International Application No. PCT/PL2009/050006.
International Preliminary Report on Patentability issued Oct. 26, 2010 in connection PCT International Application No. PCT/PL2009/050006.
Imandi et al., "Optimization of medium constituents for the production of citric acid from byproduct glycerol using Doehlert experimental design", Enzyme and Microbial Technology, Stoneham, MS, US, vol. 40, No. 5, Mar. 8, 2007, pp. 1367-1372.
Papanikolaou S. et al., "*Yarrowia lipolytica* as a potential producer of citric acid from raw glycerol", Journal of Applied Microbiology, Oxford, GB, vol. 92, Jan. 1, 2002, pp. 737-744.
Papanikolaou et al. "Industrial derivative of toallow: a promising renewable substance for microbial lipid, single-cell protein and lipase production by *Yarrow lipolytica*" Journal of Biotechnology, vol. 10, No. 3, Issue of Jul. 15, 2007.
Corzo et al. "Production and characteristics of the lipase from *Yarrowia liplytica* 681." Bioresource Technology 70 (1999) 173-180.
Drose S. et al., "Full recovery of the NADH: ubiquinone activity of complex I (NADH:ubiquinone oxidoreductase) from *Yarrowia lipolytica* by the addition of phospholipids", Biochimica et Biophysica Acta. Bioenergetics, Amsterdam, NL, vol. 1556, No. 1, Oct. 3, 2002, pp. 65-72.

(Continued)

Primary Examiner — Jon P Weber
Assistant Examiner — Kara Johnson
(74) Attorney, Agent, or Firm — Gary J. Gershik; Cooper & Dunham LLP

(57) ABSTRACT

An industrial method of reprocessing a mixture of by-products produced during biodiesel production containing a glycerol fraction and degumming residue as well as a feed additive, which may be obtained by this method.

14 Claims, 1 Drawing Sheet

(56) References Cited

OTHER PUBLICATIONS

Papanikolaou et al., "Biotechnological valorisation of raw glycerol discharged after bio-diesel (fatty acid methyl esters) manufacturing process: Production of 1, 3-propanediol, citric acid and single cell oil", Biomass and Bioenergy, Pergamon, Oxford, GB, vol. 32, No. 1, Dec. 19, 2007, pp. 60-71.
Office Action issued by the United States Patent and Trademark Office on Mar. 12, 2012 in connection with U.S. Appl. No. 12/741,311.
Response to Mar. 12, 2012 Office Action filed on Jun. 12, 2012 in connection with U.S. Appl. No. 12/741,311.
Office Action issued by the United States Patent and Trademark Office on Oct. 11, 2012 in connection with U.S. Appl. No. 12/741,311.
Response to Oct. 11, 2012 Office Action filed on Jan. 8, 2013 in connection with U.S. Appl. No. 12/741,311.
Office Action issued by the United States Patent and Trademark Office on Jan. 22, 2013 in connection with U.S. Appl. No. 12/989,101.
Response to Jan. 22, 2013 Office Action filed on Apr. 22, 2013 in connection with U.S. Appl. No. 12/989,101.
Final Office Action issued on Jun. 28, 2013 by the United States Patent and Trademark Office in connection with U.S. Appl. No. 12/989,101.
Amendment in Response to Jun. 28, 2013 Final Office Action filed Oct. 28, 2013 in connection with U.S. Appl. No. 12/989,101.
Advisory Action issued on Nov. 4, 2013 by the United States Patent and Trademark Office in connection with U.S. Appl. No. 12/989,101.
Applicant-Initiated Interview Summary mailed Nov. 4, 2013 by the United States Patent and Trademark Office in connection with U.S. Appl. No. 12/989,101.
Response to May 7, 2013 Office Action filed with the U.S. Patent and Trademark Office on Nov. 7, 2013 in connection with U.S. Appl. No. 12/741,311.

\* cited by examiner

MICROBIOLOGICAL REPROCESSING OF BY-PRODUCTS OF BIODIESEL PRODUCTION

The subject of the present invention is an industrial method of reprocessing the glycerol fraction obtained during biodiesel production, as well as a new strain of *Yarrowia lipolytica* particularly suited for use in this process.

The production of natural fuel oil components, so-called biodiesel, basically consists of the production of fatty acid esters from natural triglycerides, usu. plant lipids, via transestrification. U.S. Pat. No. 2,271,619 reveals a method of converting the glycerides of higher fatty acids into esters of short-chain alcohols via the addition of a monohydroxyl aliphatic alcohol with less than five carbon atoms in the presence of an essentially anhydrous alkali metal hydroxide as a catalyst. According to this patent, the process should be carried out in a reactor at a temperature of 86 to 212° F. (from 30 to 100° C.). The amount of alcohol should not exceed 1.75 glycerol equivalents. The amount of catalyst varies from 0.1 to 0.5% of glyceride by mass.

Subsequent patents amend or complement the patent described method. U.S. Pat. Nos. 2,360,844; 2,383,632; 2,383,580; 2,383,581; 2,383,614; 2,383,633; 2,383,596 and 2,383,599 respectively describe consecutive variants of the method revealed in U.S. Pat. No. 2,271,619 consisting of: a) the addition of an acid to the process and a spray-drying phase; b) distillation of unreacted alcohol; c) evaluation of the effects of a catalyst—suggestion of a pH range from 5 to 7; d) the use of a partial fatty acid ester technique; e) reclamation of unreacted alcohol and acidification of the liquid in order to improve the separation of glycerol and esters; f) reprocessing of partially reacted glycerides via various methods; g) further addition of addition of methanol to a monohydroxyl aliphatic alcohol (mot methanol), in order to improve liquid phase separation; as well as h) the addition of a solvent in order to improve phase separation.

Other patents suggest more extensive modifications and improvements. U.S. Pat. Nos. 2,494,366; 2,383,601; 3,963,699; 4,303,590; 4,371,470; 4,668,439; 5,399,731; 5,434,279 and 5,525,126 are also largely based on U.S. Pat. No. 2,271,619. They are respectively related to: a) the addition of an appropriate amount of acidic catalyst to the alkaline catalyst; b) readdition of the acidic estrification catalyst; c) processing under constant temperature and pressure, from vacuum to atmospheric pressure, d) addition of a second alkaline catalysis stage; e) addition of a second estrification stage and the removal of the alkyl ester using an absorbent; f) introduction of a gaseous alcohol; g) carrying the reaction out at a lower temperature with additional acid; g) introduction of an improved phase separation method using an acid; as well as h) the use of a catalyst consisting of a mixture of calcium acetate and barium acetate.

Independent of the technology used, the by-product of the transestrification of glycerides in need of reprocessing is the so-called glycerol fraction, comprising soluble hydrophilic reaction products, meaning glycerol unused catalyst as well as remaining fatty acid esters and other reagents used during further stages of separation of transestrification products, i.e. phosphoric acid and inorganic salts. In most industrial biodiesel production processes and/or by-product reprocessing used at present, the glycerol fraction is in the form of "glycerol water" containing glycerol at 20%-80%, as well as the remainders of the technological process such as soap (0-5%), fatty acid methyl esters (0-5%), methanol (0-1%), monoglycerides (0-6%), ash (0-5%) and water to 100% volume.

Another by-product of biodiesel production, which is difficult to reprocess, is the so-called gum that is formed during the initial purification and pH adjustment of plant or animal fats for transestrification, encompassing the use of phosphoric acid. The arising by-product chiefly contains phosphoric acid residues in conjunction with fats, proteins as well as other macromolecules present in the fats. Furthermore, this by-product contains free plant and animal fats at various concentrations from 0-10%, 0-10% protein, 0-5% ash, 0-1% glycerol as well as water.

The reclamation and/or reprocessing of by-products is a significant problem in the production of biodiesel.

DETAILED DESCRIPTION OF THE INVENTION

Figure 1:
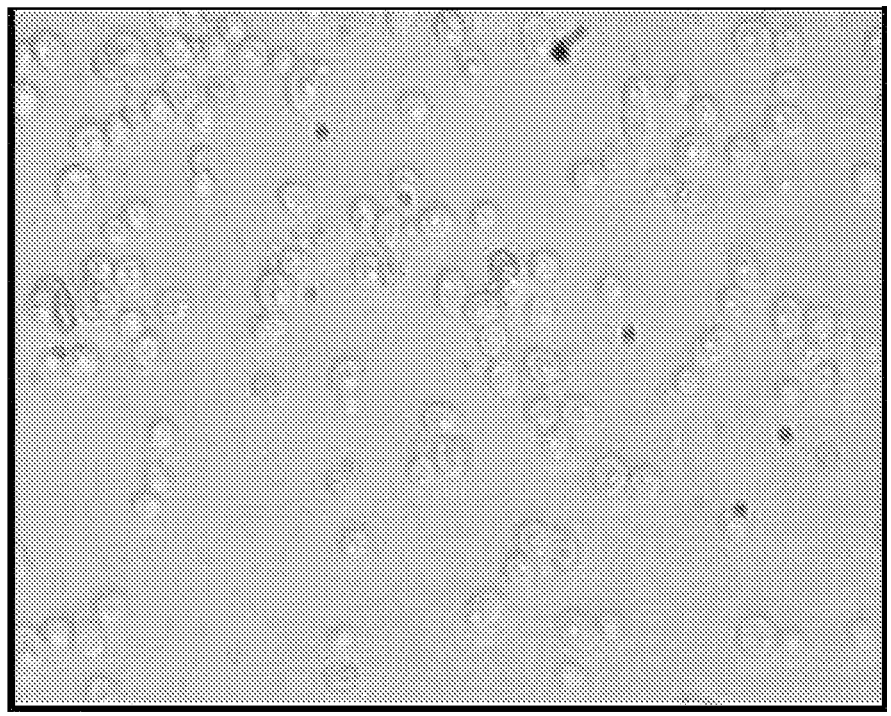
FIG. 1 shows the yeast morphology resulting from full oxygenation during culture of *Y. lipolytica*.

The goal of the present invention is to deliver a method of easily reprocessing a mixture of the aforementioned by-products formed during biodiesel production. A particular goal of the present invention is to deliver an efficient method of obtaining easily absorbed biomass from these by-products, of high nutritive quality, which method could be used industrially in the reprocessing of the glycerol fraction and degumming, taking into account the varying composition of these fractions depending on the technological process used for biodiesel production. The biomass produced should be characterised by a high content of easily absorbed protein and vitamins, as well as being suitable for use as a feed additive.

Unexpectedly, such stated problems have been solved by the present invention.

The subject of the present invention is an industrial method of reprocessing by-products obtained during biodiesel production, characterised in that yeast of the species *Yarrowia lipolytica* is cultured on a medium comprising an aqueous solution containing, as a carbon source, from 20.0 to 70.0 g/l of a mixture containing glycerol water and gum from degumming, at a temperature below 34° C., preferentially from about 28° C. to about 31° C., medium oxygen loading of at least 20% saturation with $O_2$, a pH value maintained from 2.5 to 7.5, until a substantial exhaustion of the carbon source available in the medium, where, preferentially, the culture is maintained in a periodical fashion, and a portion of the culture broth at the end of a production cycle is replaced with fresh medium. Preferentially, the medium contains at least one component selected from among from a group encompassing: ammonium sulphate, potassium phosphate, magnesium sulphate, urea, thiamine, sodium hydroxide, yeast extract, corn mash, Chitosan as well as Acepol, at rates of 0.5 to 15 g/L medium. Equally preferentially the carbon source used is a mixture of glycerol water and degumming residue, where the degumming residue comprises at least 15%. Preferentially, the culture is maintained at a pH from about 3.4 to about 3.6, preferentially at 3.5±0.1, and culture completion is indicated by a pH increase to 4.5. The biomass obtained may be spray-dried, at a temperature of about 200° C. at the input and 90° C. at the tunnel egress. Preferentially, the culture is maintained in a volume of at least 1000 L. In a preferential embodiment, the drawn-off culture broth results in 15 to 35 g/L of dry yeast mass, biomass production occurs at a rate of 1.5 to 3.0 g/L·h or with an overall efficiency of 0.4 to 0.5 g dry biomass/g glycerol fraction added to the medium, whereas dry mass protein content varies from 30 to 50% by mass. The culture may make use of the *Yarrowia lipolytica* strain SKOTAN deposited in the IBPRS under the accession number KKP 2018 p.

The *Yarrowia lipolytica* SKOTAN strain has been deposited in the deposit bank working in accordance with the treaty of Budapest and maintained by the Instytut Biotechnologii Przemyslu Rolno-Spożywczego (henceforth IBPRS), ul. Rakowiecka 36, 02-532 Warszawa and has been given the accession number KKP 2018 p. This is a wild-type strain, which has been selected from among many strains of this species belonging to the collection of the Uniwersytet Przyrodniczy of Wroclaw tested during the research on the present invention. The selection criteria chiefly consisted of the culture conditions on a medium based on the glycerol fraction. First of all, with this strain of the yeast *Yarrowia lipolytica*, it was possible to achieve a particularly preferable biomass production efficiency as well as a considerable tolerance of deleterious culture conditions such as increasing osmotic pressure as well as a relatively low pH in the medium. Due to this, the culture process is much simpler since there is little risk of it becoming contaminated by other microorganisms. At the same time, the biomass produced possesses preferential nutritive quantities such as a high content of easily absorbed protein and vitamins, particularly of the family. Due to this it can be used as a high-quality feed additive.

The subject of the present invention is also a feed yeast containing from 42% to 49.3% protein in dry mass. Preferentially, the total content of the amino-acids Ile, Leu, Lys, Met, Cys, Phe, Tyr, Thr, Trp, and Val is over 36 g/100 g protein, preferentially from about 36.6 to about 36.8 g/100 g protein. Equally preferentially, the content of the selected amino-acids in the said protein is in the range defined in Table 3.

The next subject of the present invention is the use of the *Yarrowia lipolytica* SKOTAN strain deposited at the IBPRS under the accession number KKP 2018 p in the reprocessing of by-products of biodiesel production, where the by-products comprise a mixture of glycerol water and degumming residue. Preferentially, the biomass produced is used in feed production.

EXAMPLE 1

Basic medium composition (Medium 1) for the production of biomass of the yeast *Yarrowia lipolytica* on a medium based on the glycerol fraction from biodiesel production (g/liter):

| | |
|---|---|
| glycerol fraction | from 20.0 to 70.0, preferentially about 50.0 |
| (NH$_4$)$_2$SO$_4$ | 8.5-15.0, preferentially about 12.6 |
| Urea | 1.5-6.5, preferentially about 4.0 |
| MgSO$_4$ × 7H$_2$O | 0.5-3.0, preferentially about 1.0 |
| KH$_2$PO$_4$ | 0.1-2.0, preferentially about 0.5 |
| Yeast extract | 0.1-2.0, preferentially about 0.5 |
| Tap water | 1000 ml |
| pH | 2.5-7.5, preferentially about 3.5-4.0 |

The above proportions of medium components (Medium 1) should be weighed for a volume of 1100 L and brought to 1000 L with tap water.

In certain cases, as appropriate to the production goal (i.e. contraction of the growth time, protein maximisation, optimalisation of the amounts and composition of amino-acids or dry mass, etc.) the medium should be supplemented with other components for enriching or regulating the process, such as those given as examples in Table 1 below:

TABLE 1

| Compounds enriching the medium | Effect on production | | | |
|---|---|---|---|---|
| | time | dry mass | amino-acid | protein |
| Ammonium sulphate | − | + | + | + |
| Potassium phosphate | − | + | + | + |
| Magnesium sulphate | − | + | − | − |
| Urea | − | + | + | + |
| Thiamine | − | + | − | − |
| Sodium hydroxide | + | + | + | + |
| Yeast extract | | + | + | + |
| Corn mash | + | + | + | + |
| Chitosan | + | − | − | − |
| Acepol | + | − | − | − |
| Oxygen (from air) | + | + | + | + |

"+" denotes a positive effect
"−" denotes a negative effect

The content of foreign mineral or biological substances (i.e. heavy metals, toxins, etc.) in the raw materials used in the production should not exceed that allowed for feed products described in appropriate norms and regulations.

After completely dissolving the medium components, they are poured into the bioreactor, and 100 L of cultured yeast cells are added from a bioreactor with a 150 L working volume, cultured as above.

Culture conditions for various strains of the yeast *Yarrowia lipolytica*:
the culture should be maintained at a temperature of 25-35° C. (preferentially about 30° C.±1), at an agitation rate of 400-1200 RPM (preferentially about 700-800), an aeration rate of 0.2-4 L air/1 L medium/min. (preferentially about 1-1.5 L air/1 L medium/min.). The pH should be maintained automatically using 10N NaOH. If copious foaming occurs, a defoamer such as ACEPOL or another should be used.

Process control using a PH-STAT is based on the regulation of the pH of the feed yeast culture production medium. The regulation consists of the monitoring of culture medium pH during yeast production. The control apparatus maintains a pH of 3.5 with oscillations from 3.4-3.6. An initial pH of 3.5 is an absolute requirement and is achieved via the addition of sodium hydroxide. The stabilised pH level limits the growth of undesirable bacterial flora and makes it possible to obtain a homogenous culture of *Y. lipolytica* without other yeasts and bacteria.

A pH increase above and beyond 4.5 means the termination of the yeast production process and is evidence of the exhaustion of all of the available nutrients in the medium.

The next significant culture parameter is the medium temperature. The temperature should not exceed 34° C. The optimal temperature of the reaction mixture is 28-31° C.

Figure 2:
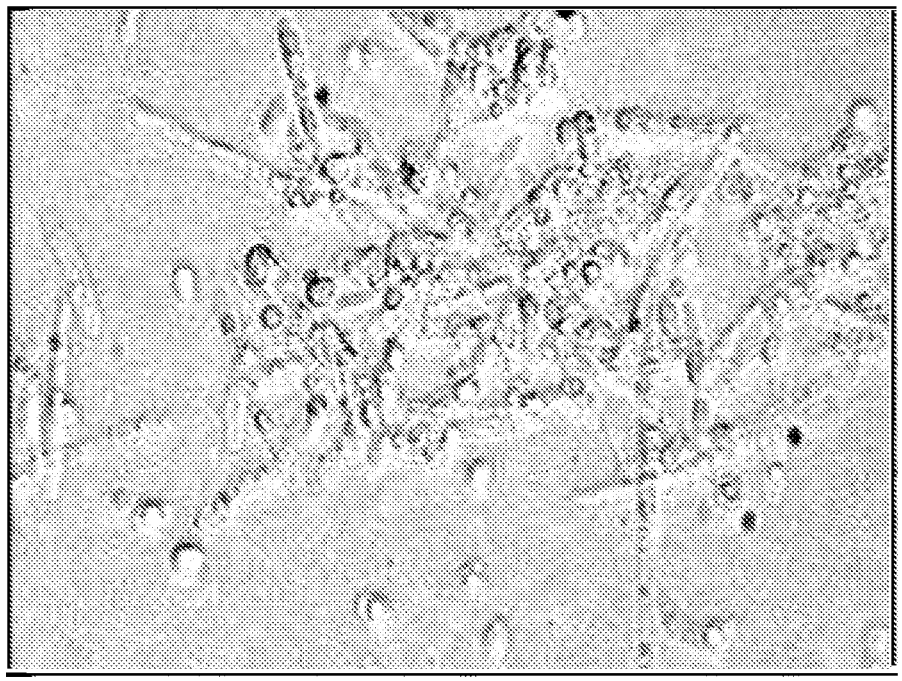
FIG. 2 shows mycelia of *Y. lipolytica* resulting from insufficient aeration of the medium during culture of *Y. lipolytica*.

Culture oxygenation is also a significant parameter. Oxygenation should exceed 20% O$_2$ saturation. Such an oxygenation index may be obtained through the use of a bioreactor with a FRINGS-type aerator (a FRINGS turbine). The oxygenation level affects the culture efficiency as well as yeast cell morphology. Full oxygenation results in yeast as shown below in FIG. 1. Insufficient aeration of the medium results in mycelia of *Y. lipolytica* (FIG. 2).

The culture should be maintained until the exhaustion of the available carbon source (here glycerol) in the culture medium. 200 L of the cell suspension should be left into which the medium components (Medium 1) should be weighed off for a total volume of 1100 liters, and 900 liters of water should be added. Such a culture method (periodic and repeated) may be carried out from 5 to 15 times.

This yeast propagation process makes it possible to obtain 15-35 g/L (preferentially about 33 g/L) of yeast dry mass at a rate of 1.5-3.0 g/l·h (preferentially about 2.5 g/l⊕h), with an overall efficiency of at least 0.4-0.5 g yeast dry mass/g glycerol fraction, (preferentially about 0.60 g/g in the case of the *Yarrowia lipolytica* SKOTAN strain).

The dry yeast protein content varies from 30 to 50%. Using the *Yarrowia lipolytica* SKOTAN strain, a yeast dry mass protein content of about 42% was achieved for the basic medium composition (Medium 1) described above, as well as from 42% to 48.6% for various additional medium variants described in Table 1 above.

Measurements of amino-acid content (expressed in grams per 100 grams protein) obtained from cultures of the *Yarrowia lipolytica* SKOTAN strain on various medium variants described above are shown in Table 2 below in conjunction with 1998 FAO-WHO requirements for reference proteins.

TABLE 2

| Amino-acid | Human milk protein | Chicken egg protein | 1991 FAO/WHO reference | Results for *Y. lipolytica* SKOTAN | |
|---|---|---|---|---|---|
| | | | | Min | Max |
| Ile | 2.9 | 5.6 | 2.8 | 2.38 | 3.43 |
| Leu | 5.8 | 6.4 | 6.6 | 4.0 | 5.77 |
| Lys | 4.2 | 5.0 | 5.8 | 4.14 | 7.48 |
| Met + Cys | 2.6 | 4.5 | 2.5 | 1.51 | 1.90 |
| Phe + Tyr | 4.5 | 7.5 | 6.3 | 8.9 | 10.4 |
| Thr | 2.7 | 3.2 | 3.4 | 3.72 | 4.91 |
| Trp | 1.1 | 1.0 | 1.1 | 0.83 | 0.96 |
| Val | 3.4 | 5.1 | 3.5 | 3.14 | 4.44 |
| Total amino-acid | 27.2 | 38.3 | 32 | 27.9 | 39.3 |
| OSERA index | | 100 | | 63.7 | 81.7 |
| EAA index | | 100 | | 61.4 | 80.8 |

The biomass produced may be further processed, such as through drying using known methods, in particular spray-drying, and then apportioned for distribution and used as a high-quality feed additive, particularly for use in bovine and chicken feed. Condensation of the yeast suspension for spray drying was performed using the following methods: flocculation using Chitosan, microfiltration, centrifugation in a filtration centrifuge. The condensation level depends on the type of spray-dryer. Drying should be performed at a temperature of 200° C. at the input and 90° C. at the tunnel output.

The yeast is in powder form, with a specific smell and a beige-brown colour.

EXAMPLE 2

Production of Feed Yeast on a Medium Containing the Glycerol Fraction (Glycerol Water) as Well as Degumming Residue Production is carried out as in Example 1, with the difference that instead of the glycerol fraction, the medium was supplemented with an analogous quantity of raw glycerol water and degumming residue at arbitrary proportions. Optimal mixtures contain degumming residue at 15% to less than 100% of the mentioned mixture added to the medium. The most preferential culture results were obtained using full aeration and a pH maintained at 3.5±0.1 during culturing. Conditional to the use of such a mixture is the use of an appropriate aeration level and method of agitation in the reactor (the use of turbines instead of frame mixers).

The protein content in *Yarrowia lipolytica* dry mass varied from 42% to 49.3% in multiple replicants, depending on the compounds added to enrich the mixture, as listed in Table A.

The results of amino-acid level measurements (expressed in grams per 100 grams protein) obtained in yeast cultures of the *Yarrowia lipolytica* SKOTAN strain on various medium variants containing glycerol water and degumming residue is shown in Table 3 in conjunction with the 1998 FAO-WHO reference requirements for reference proteins.

TABLE 3

| Amino-acid | Human milk protein | Chicken egg protein | FAO/WHO reference from 1991 | Results for *Y. lipolytica* Skotan | |
|---|---|---|---|---|---|
| | | | | Min | Max |
| Ile | 2.9 | 5.6 | 2.8 | 2.89 | 3.48 |
| Leu | 5.8 | 6.4 | 6.6 | 4.61 | 5.85 |
| Lys | 4.2 | 5.0 | 5.8 | 4.61 | 5.54 |
| Met + Cys | 2.6 | 4.5 | 2.5 | 2.27 | 2.76 |
| Phe + Tyr | 4.5 | 7.5 | 6.3 | 10.8 | 11.5 |
| Thr | 2.7 | 3.2 | 3.4 | 3.69 | 4.13 |
| Trp | 1.1 | 1.0 | 1.1 | 0.97 | 1.2 |
| Val | 3.4 | 5.1 | 3.5 | 3.81 | 4.41 |
| Total amino-acids | 27.2 | 38.3 | 32 | 36.6 | 36.8 |
| OSERA index | | 100 | | 81.9 | 83.9 |
| EAA index | | 100 | | 81.3 | 82.5 |

Yeast produced on glycerol-degumming residue mixtures change colour to beige-pale brown and acquire a sharper smell as the degumming residue content is increased.

The invention claimed is:

1. A process of producing biomass from a mixture of glycerol water and degumming residue, comprising culturing a yeast culture of the species *Yarrowia lipolytica* on a medium comprising an aqueous solution containing, as a carbon source, from 20.0 to 70.0 g of the mixture containing glycerol water and degumming residue per liter of the aqueous solution, at a temperature below 34° C., with medium oxygenation in excess of 200 of $O_2$ saturation, maintained at a pH of 2.5 to 7.5, essentially until the exhaustion of the carbon source contained in the medium, to obtain a cultured broth containing biomass, so as to thereby produce biomass from glycerol water and degumming residue;
   wherein degumming residue comprises phosphoric acid residues and contains water, 0-10% fats, 0-10% protein, 0-5% ash and 0-1% glycerol.

2. The process of claim 1, wherein the medium additionally contains at least one component selected from the group consisting of ammonium sulphate, potassium phosphate, magnesium sulphate, urea, thiamine, sodium hydroxide, yeast extract, corn mash, Chitosan and Acepol, at a concentration of 0.5 to 15 g/L medium.

3. The process of claim 1, wherein the proportion of degumming residue is 15% to less than 100% of the mixture.

4. The process of claim 1, wherein the yeast culture is maintained at a pH from about 3.4 to about 3.6, and exhaustion of the carbon source is signaled by a pH increase to 4.5.

5. The process of claim 4, wherein the yeast culture is maintained at a pH of 3.5±0.1.

6. The process of claim 1, further comprising spray-drying the biomass produced, at a temperature of about 200° C. at an input and about 90° C. at a tunnel output.

7. The process of claim 1, wherein the yeast culture is maintained in a volume of about 1000 liters.

8. The process of claim 1, wherein 15 to 36 g/L of yeast dry mass is obtained from the culture broth.

9. The process of claim 1, wherein the biomass is produced by the culture at a rate of 1.5 to 3.0 g/L·h.

10. The process of claim 1, wherein the biomass is produced by the culture at an overall efficiency of 0.4 to 0.5 g dry biomass/g glycerol water in the medium.

11. The process of claim 1, wherein the protein content in the biomass is from 30 to 50% by dry mass.

12. The process of claim 1, wherein the yeast is of the *Yarrowia lipolytica* SKOTAN strain isolated and deposited in the IBPRS under the accession number KKP 2018p.

13. The process of claim 1, wherein the yeast culture is at a temperature of about 28° C. to about 31° C.

14. The process of claim 1, wherein the yeast culture is maintained in a periodically repeated way by replacing a portion of the cultured broth with a fresh portion of the medium after each exhaustion of the carbon source.

* * * * *